United States Patent [19]

Havinga et al.

[11] 3,906,029

[45] Sept. 16, 1975

[54] N,N'-BIS(P-PHENOXYCARBOPHENYL)SULFONDIAMIDE

[75] Inventors: Reginoldus Havinga, Schalkhaar; Pieter Dirk Swaters, Lochem, both of Netherlands

[73] Assignee: Koninklijke Industrieele Maatschappij Noury & Van der Lande N.V., Deventer, Netherlands

[22] Filed: July 6, 1973

[21] Appl. No.: 377,095

Related U.S. Application Data

[62] Division of Ser. No. 67,588, Aug. 27, 1970, Pat. No. 3,809,707.

[30] Foreign Application Priority Data

Aug. 28, 1969 Netherlands.................. 6913138

[52] U.S. Cl. .............................................. 260/470
[51] Int. Cl. ............................................. C07c 161/00
[58] Field of Search .................................... 260/470

[56] References Cited
UNITED STATES PATENTS

| | | | |
|---|---|---|---|
| 2,608,506 | 8/1952 | Sprague et al. ................ | 424/271 |
| 3,123,631 | 3/1964 | Staiger et al. ................ | 260/471 R |
| 3,206,431 | 9/1965 | Doyle et al. ................ | 260/45.85 |
| 3,529,982 | 9/1970 | Luethi et al. ................ | 260/471 R |

FOREIGN PATENTS OR APPLICATIONS

| | | |
|---|---|---|
| 910,880 | 11/1962 | United Kingdom |
| 26-1217 | 3/1951 | Japan |

OTHER PUBLICATIONS

Heacock et al., J. Chem. Soc. (1954), pp. 2481–2484.
Wagner et al., "Synthetic Organic Chemistry," Wiley & Sons, Inc., N.Y. (1965), pp. 822, 823.

*Primary Examiner*—John F. Terapane
*Attorney, Agent, or Firm*—Stevens, Davis, Miller & Mosher

[57] ABSTRACT

Ultraviolet light stabilized polymers having incorporated therein a stabilizing amount of a compound having the general formula:

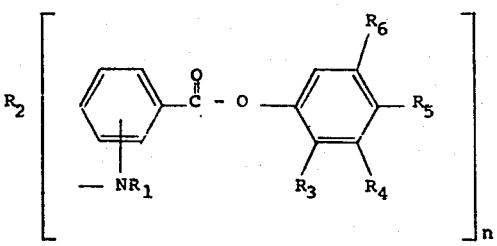

wherein $R_1$ represents a hydrogen atom, an alkyl group or an acetyl group, $R_3$, $R_4$, $R_5$ and $R_6$ are the same or different and each represents a hydrogen atom, a halogen atom, a hydroxyl group, an alkyl group or an alkoxy group having up to 12 carbon atoms or an aryl group, $n$ being 1 or 2 and, when $n = 1$, $R_2$ a hydrogen atom, an alkyl group, an acyl group having up to 20 carbon atoms, a substituted or non-substituted aroyl group, a phenoxy carbonyl group or a substituted or non-substituted benzene sulfonyl group and, when $n = 2$, $R_2$ is a sulfonyl, carbonyl or dioxaloyl group or a group having the formula

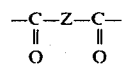

where Z represents a phenylene group or an alkylidene group having up to 12 carbon atoms. Many of the compounds within this general formula are novel per se, and accordingly are claimed as such.

1 Claim, No Drawings

N,N'-BIS(P-PHENOXYCARBOPHENYL)SULFON-DIAMIDE

This is a division of application Ser. No. 67,588, filed Aug. 27, 1970, now U.S. Pat. No. 3,809,707.

The present invention relates to ultraviolet light stabilizers, that is to say, compounds which provide stabilization against the deteriorative effects of ultraviolet light, and provides a new class of such compounds and processes for their preparation. The present invention also relates to processes for preparing stabilized polymers by means of the novel compounds according to the invention and of related compounds. Moreover, the invention relates to novel stabilized compositions.

It is known that polymers, such as polyethylene, polypropylene, polyisobutylene, copolymers of ethylene with higher alkenes such as propylene and butylene or with vinyl acetate, polystyrene, polyvinyl chloride, polyvinylidene chloride, copolymers of vinyl chloride with vinylidene chloride, polyvinyl acetate, polyester resins, polyurethanes, cellulose derivatives and other polymeric materials, may undergo degradation under the influence of ultraviolet light; this degradation takes the form of deterioration of the physical properties and/or of the color of the polymers.

It has now been found that this degradation may be reduced, or avoided, by incorporating in the polymers a stabilizing amount of one or more previously unknown compounds according to this invention, having the general formula:

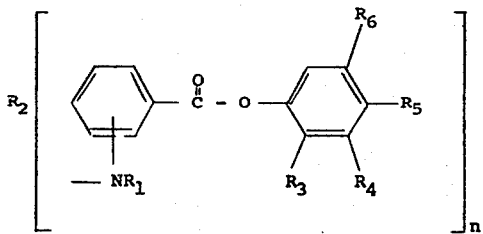

wherein $R_1$ represents a hydrogen atom, an alkyl group or an acetyl group, $R_3$ and $R_5$ are the same or different and each represents a hydrogen atom, a halogen atom, a hydroxy group, an alkyl group having up to 12 carbon atoms or an aryl group, $R_4$ and $R_6$ are the same or different and each represents a hydrogen atom, a halogen atom, a hydroxy group, an alkyl or alkoxy group having up to 12 carbon atoms or an aryl group, $n$ being 1 or 2 and, when $n = 1$, $R_2$ is an acyl group having up to 20 carbon atoms, a substituted or non-substituted aroyl group, a phenoxy carbonyl group or a substituted or non-substituted benzene sulfonyl group and, when $n = 2$, $R_2$ is a sulfonyl, carbonyl or dioxaloyl group or a group having the general formula

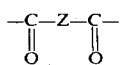

where Z is a phenylene group or an alkylidene group having up to 12 carbon atoms.

Examples of novel compounds according to the above formula are:
1. phenyl-N-acetyl-anthranilate
2. phenyl-p-N-acetyl aminobenzoate
3. phenyl-p-N-acryloyl-aminobenzoate
4. phenyl-N-tosyl-anthranilate
5. phenyl-p-N-tosyl-aminobenzoate
6. p-tert.butylphenyl-N-acetyl-anthranilate
7. p-nonylphenyl-N-acetyl-anthranilate
8. p-chlorophenyl-N-acetyl-anthranilate
9. p-phenylphenyl-N-acetyl-anthranilate
10. m-hydroxyphenyl-N-acetyl-anthranilate
11. phenyl-N-nonanoyl-anthranilate
12. phenyl-p-N-nonanoyl-am nobenzoate
13. phenyl-N-stearoyl-anthranilate
14. m-hydroxyphenyl-N-nonanoyl-anthranilate
15. phenyl-m-N-acetyl-aminobenzoate
16. phenyl-N-benzoyl-anthranilate
17. phenyl-m-N-tosyl-aminobenzoate
18. m-octoxyphenyl-N-acetyl-anthranilate
19. phenyl-p-N-(4-dodecylbenzene-sulfonyl)aminobenzoate
20. phenyl-N-(4-chlorobenzoyl)anthranilate
21. phenyl-N-(4-cyanobenzoyl)anthranilate
22. phenyl-N-(2-methoxybenzoyl)anthranilate
23. phenyl-N-(3-isopropylbenzoyl)anthranilate
24. phenyl-N-(4-tert.butylbenzoyl)anthranilate
25. phenyl-N-methyl-N-acetyl-anthranilate
26. 2-chloro-4-phenylphenyl-N-acetyl-anthranilate
27. 2,4,5-trichlorophenyl-N-acetyl-anthranilate
28. p-nonylphenyl-N-tosyl-anthranilate
29. N,N'-bis(o-phenoxycarbophenyl)urea
30. N,N'-bis(o-phenoxycarbophenyl)oxalyl-diamide
31. N,N'-bis(o-phenoxycarbophenyl)adipoyl-diamide
32. N,N'-bis(p-phenoxycarbophenyl)sulfon-diamide
33. N,N'-bis(m-phenoxycarbophenyl)adipoyl-diamide
34. N,N'-bis(o-phenoxycarbophenyl)terephthaloyl-diamide
35. N,N'-bis(o-phenoxycarbophenyl)dodecanedioyl-diamide
36. N,N'-bis[2-(4-tert.butylphenoxycarbo)phenyl]adipoyl-diamide
37. N,N'-bis[2-(4-nonylphenoxycarbo)phenyl]adipoyl-diamide
38. N,N'-dimethyl-N,N'-bis(o-phenoxycarbophenyl)adipoyl-diamide
39. phenyl-N,N-diacetyl-anthranilate
40. phenyl-N-phenoxycarbo-anthranilate
41. p-tert.octylphenyl-N-acetyl-anthranilate
42. p-dodecylphenyl-N-acetyl-anthranilate
43. N-(2-phenoxycarbo)phenyl-N'-phenyl-urea
44. phenyl-N-hexyl-N-acetyl-anthranilate These compounds and the compounds
45. phenyl-p.N,N-dimethyl-amino-benzoate
46. p-tert.butylphenyl-anthranilate
47. m-hydroxyphenyl-anthranilate
48. phenyl-N-methyl-anthranilate
49. phenyl-p-amino benzoate are referred to below, for convenience, by the numbers given in the left column.

The novel compounds of the general formula I may be prepared, in accordance with another aspect of this invention, by reacting a compound having the general formula:

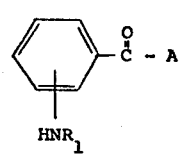

with a compound having the general formula:

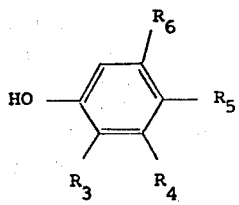

where $R_1$, $R_3$, $R_4$, $R_5$ and $R_6$ have the meanings previously defined and A is a halogen atom or a hydroxy group, II preferably being an aminobenzoyl chloride, in an aqueous medium or an organic solvent, isolating the resultant compound of the formula:

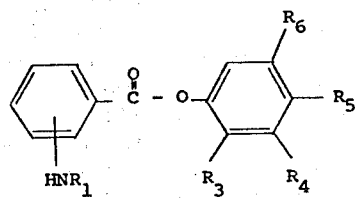

and converting it into an acid amide or a sulfonamide of formula I.

The reaction is preferably carried out in the presence of an alkaline compound at a temperature from 0°C. to the boiling point of the solvent. Suitable solvents include benzene, dioxane, ethylene glycol dimethyl ether, chloroform, carbon tetrachloride, hexane and petroleum ether. If the aminobenzoyl chloride and the phenol, i.e., the compounds of formulae II and III, are reacted in an organic solvent, pyridine, triethylamine and sodium carbonate may be used as alkaline compounds. The acid chloride, II, may be added per se or dissolved, preferably in the same solvent. If this reaction takes place in water, sodium hydroxide, potassium hydroxide, ammonium hydroxide or a water-soluble amine may also be used. The acid chloride is then added to the phenolic solution per se or dissolved in an organic solvent such as ethylene glycol dimethyl ether, dioxane or other water-miscible organic solvent.

Compounds according to the present invention wherein the amino group is in the ortho position relative to the ester carbonyl group may be advantageously obtained by starting from compounds having the general formula:

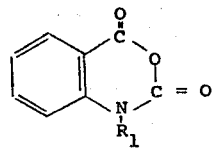

wherein $R_1$ represents hydrogen or alkyl. The reaction with a phenol may be carried out in a solvent, e.g., dioxane, acetone, dimethyl sulfoxide, or tetrahydrofurane, in the presence of an alkaline compound such as potassium hydroxide or sodium hydroxide. While the carbon dioxide is escaping, compounds are formed having the general formula:

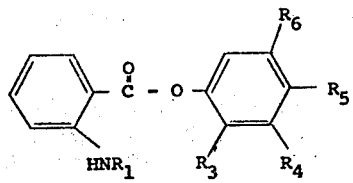

The compounds of the formulae IV and VI may be isolated from the reaction mixture by removing the solvent used, e.g., by decantation, filtering or distillation.

After purification by appropriate methods, these compounds may be characterized by determining their physical constants such as melting point, refractive index and their characteristic infrared absorption bands.

Preferred reaction components which may be used include alkylated or non-alkylated isatoic anhydrides, alkylated or nonalkylated aminobenzoic acids and aminobenzoyl chlorides, phenol, p-tert.-butylphenol, p-nonylphenol, p-chlorophenol, p-dodecylphenol, p-phenylphenol, resorcinol and meta-octyloxyphenol.

The aminobenzoyl chlorides to be used may be obtained in known manner by reacting the corresponding acids with chlorinating agents, such as $POCl_3$, $PCl_3$, $PCl_5$ or $SOCl_2$.

The conversion of the compounds of the formulae IV and VI to the corresponding acid amides or sulfonamides may be carried out in a dry solvent, such as benzene, carbon tetrachloride, chloroform, petroleum ether, hexane, diethyl ether, ethylene glycol dimethyl ether, dioxane, ethyl acetate or n-butyl acetate, preferably in the presence of an alkaline substance such as an amine, e.g. pyridine or triethylamine.

As acylating or sulfonating agents, there may be used acetyl chloride, acryloyl chloride, n-nonanoyl chloride, stearoyl chloride, benzoyl chloride, substituted benzoyl chloride, p-toluene sulfonyl chloride, terephthaloyl chloride, sulfuryl chloride, oxaloyl chloride, succinoyl chloride, dodecanoic dichloride, phosgene and phenylchloroformate. Ketene or acetic anhydride may also be used as acetylating agents. After purification by appropriate methods, the acylated or sulfonated compounds may be characterized by determining their physical constants such as melting point or refractive index or their characteristic infrared absorption bands.

In addition to the novel compounds according to the invention, phenyl p-aminobenzoate, as described in Farmaco Ed. Sci. 12 (1957); phenyl anthranilate, as described in U.S. Patent No. 3,123,631; phenyl N-methyl anthranilate, as described in J. Org. Chem. 24, 1214 (1959); phenyl p-N,N-diethyl-aminobenzoate, as described in German Patent No. 1,115,252; p-alkyl phenylanthranilate, as described in U.S. Pat. No. 2,776,959; and p-alkyl phenyl-p-aminobenzoate, as described in French Pat. No. 1,253,378 may also be used in order to reduce or avoid the degradation of polymers by ultraviolet light. In this literature, it is not mentioned that these compounds may be used for avoiding degradation of polymers.

Consequently, the invention also relates to the stabilization of polymers with the aid of compounds having the general formula I, wherein $R_1$ to $R_6$ have the meanings given and wherein $R_3$ and $R_5$ can each additionally represent an alkoxy group having up to 12 carbon atoms and wherein, when $n = 1$, $R_2$ can additionally represent a hydrogen atom or an alkyl group.

For use as U.V. absorbers, the compounds according to the present invention may be homogeneously incorporated in the polymers to be stabilized, if desired in the presence of other additives, e.g., plasticizers, pigments, heat stabilizers and lubricants, by known techniques such as roller mixing. They are preferably incorporated in the polymer in amounts of 0.1 – 5% by weight.

The following examples and tables illustrate the invention. Where in these examples and tables reference is made to characteristic infrared absorption bands, these are expressed in microns.

EXAMPLE I 84.9 g of isatoic anhydride (96%), 47.0 g of phenol, 1.63 g of KOH and 500 ml of acetone were heated under reflux for 2.5 hours. After cooling, the reaction mixture was poured into water, the precipitate was drawn off by suction and dried. 105.5 of phenyl anthranilate were obtained.

| | |
|---|---|
| Yield | 99% |
| M. P. | 69.5°–71°C. |
| Charact. IR abs. | (NH$_2$ band 2.82/2.92 |
| | (C=O ester band 5.90 |

21.3 g of the phenyl anthranilate obtained, 8.64 g of acetyl chloride (95%) and 400 ml of n-hexane were heated under reflux for 3 hours. After cooling the mixture, the precipitate was drawn off by suction. 25.4 g of compound (1) were obtained, having the formula:

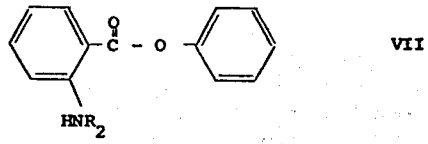

| | |
|---|---|
| Yield | 99.5% |
| M. P. | 78–79°C. |
| Charact. IR abs. | (NH band 3.00 |
| | (C=O ester band 5.85 |
| | (C=O amide band 5.92 |

Starting from phenyl anthranilate, in an analogous way, the following compounds were obtained having the general formula:

VII

TABLE 1

Part 1

| acylating agent or sulfonating agent | solvent | base | product |
|---|---|---|---|
| p-toluene sulfonyl chloride (tosyl chloride) | acetone | pyridine | (4) |
| n-nonanoyl chloride | chloroform | — | (11) |
| benzoyl chloride | " | — | (16) |
| stearoyl chloride | " | — | (13) |
| p-chlorobenzoyl chloride | " | pyridine | (20) |
| m-isopropylbenzoyl chloride | " | " | (23) |
| o-methoxybenzoyl chloride | " | " | (22) |
| p-cyanobenzoyl chloride | " | " | (21) |
| p-tert.butylbenzoyl chloride | " | " | (24) |
| phenylchloroformate | " | K$_2$CO$_3$.Oaq. | (40) |
| phenylisocyanate | benzene | — | (43) |

TABLE 2

Part 2

| Product | R$_2$ | physical constants | characteristic IR absorption bands |
|---|---|---|---|
| (4) | SO$_2$C$_6$H$_4$CH$_3$—p | M.P. 226°–229°C.(−) | NH 3.01; C = O ester 5.89; S = O 7.41/8.62/10.85 |
| (11) | COC$_8$H$_{17}$—n | liquid n$_D^{20}$ = 1.5453 | NH 2.99; C = O ester 5.89; C = O amide 5.91 |
| (16) | COC$_6$H$_5$ | M.P. 166°–168.5°C. | NH 3.00; C = O ester 5.92; C = O amide 5.99 |
| (13) | COC$_{17}$H$_{35}$—n | M.P. 51°–53°C. | NH 2.99; C = O ester 5.90; C = O amide 5.90 |
| (20) | COC$_6$H$_4$Cl—p | M.P. 130.5°–132.5°C. | NH 3.03; C = O ester 5.99; C = O amide 5.99 |
| (23) | COC$_6$H$_4$CH(CH$_3$)$_2$—m | M.P. 123°–124.5°C. | NH 2.99; C = O ester 5.90; C = O amide 5.99 |
| (22) | COC$_6$H$_4$OCH$_3$—o | M.P. 92°–93.5°C. | NH 3.03; C = O ester 5.82; C = O amide 6.08 |
| (21) | COC$_6$H$_4$CN—p | M.P. 166°–168°C. | NH 3.05; C = O ester 5.96; C = O amide 6.00; C = N 4.50 |
| (24) | COC$_6$H$_4$C(CH$_3$)$_3$—p | M.P. 114°–117°C | NH 3.03; C = O ester 5.90; C = O amide 6.01 |

TABLE 2 —Continued

Part 2

| Product | R₂ | physical constants | characteristic IR absorption bands |
|---|---|---|---|
| (40) | CO.OC₆H₅ | M.P. 97.5°–98°C. | NH 3.04; C=O ester 5.91; C=O amide 5.71 |
| (43) | CONHC₆H₅ | M.P. 153°–157°C. | NH 3.04; C=O ester 5.86; C=O amide 6.01 |

Compound (1) was also obtained by passing ketene into a solution of phenyl anthranilate in n-butyl acetate at room temperature, yield 98%, or by heating in benzene with acetic anhydride, yield 76%.

EXAMPLE II 27.4 g of p-aminobenzoic acid were heated under reflux with 100 ml of thionyl chloride for 2 hours and then the excess thionyl chloride was distilled off under reduced pressure. The crude p-aminobenzoyl chloride was incorporated in 100 ml of dry benzene and added to a suspension of 23.2 g of sodium phenolate in 250 ml of dry benzene. The mixture was heated under reflux for 2 hours and, after cooling, treated with water and a saturated soda solution. After drying the benzene solution was saturated with hydrogen chloride gas. The precipitate of phenyl-p-aminobenzoate hydrochloride obtained was centrifuged off. From the solid phase, 42.0 g of phenyl-p-aminobenzoate was obtained with the aid of bicarbonate.

| | | |
|---|---|---|
| Yield | | 88% |
| M. P. | | 168°–171°C. |
| Charact. IR abs. | (NH₂ band | 2.88/2.95 |
| | (C=O ester band | 5.88 |

In an analogous way, phenyl-m-aminobenzoate was obtained.

| | | |
|---|---|---|
| Yield | | 85% |
| M. P. | | 45.5°–46.5°C. |
| Charact. IR abs. | (NH₂ band | 2.89/2.96 |
| | (C=O ester band | 5.81 |

21.3 g of the phenyl-p-aminobenzoate so obtained were reacted with acetyl chloride in chloroform as solvent in the way described in Example I. 24.0 g of compound (2) were obtained, having the formula:

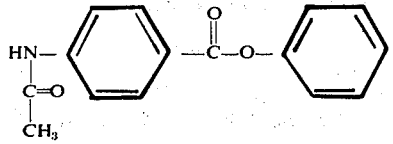

| | |
|---|---|
| Yield | 94% |
| M.P. | 137°C. |
| Charact. IR abs. | (NH band 2.97 |
| | (C=O ester band 5.78 |
| | (C=O amide band 5.97 |

Starting from phenyl-m-aminobenzoate, in an analogous way, compound (15) was obtained, having the formula:

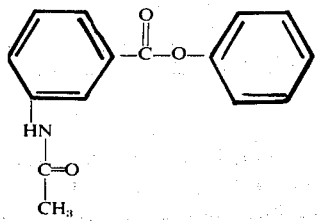

| | |
|---|---|
| Yield | 95% |
| M.P. | 134°–135°C. |
| Charact. IR abs. | (NH band 2.94 |
| | (C=O ester band 5.82 |
| | (C=O amide band 5.90 |

Starting from the m- or p-aminobenzoate, in an analogous way, the following compounds were obtained having the general formula:

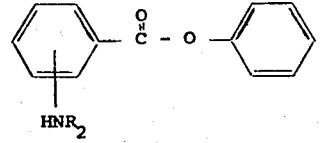

VIII

Table 2

Part 1

| acylating agent or sulfonating agent | solvent | base | product |
|---|---|---|---|
| acryloyl chloride | chloroform | — | ( 3) |
| p-toluene sulfonyl chloride | diethylether | pyridine | ( 5) |
| n-nonanoyl chloride | chloroform | — | (12) |
| p-dodecylbenzene sulfonyl chloride | ethylene glycol dimethyl ether | pyridine | (19) |
| p-toluene sulfonyl chloride | diethylether | pyridine | (17) |

TABLE 2

| Product | $R_2$ | Part 2 physical constants | characteristic IR absorption bands |
|---|---|---|---|
| (3) | COCH:CH$_2$ | M.P. 115°–120°C. | NH 2.93; C=O ester 5.79; C=O amide 5.99; C—O 6.10 |
| (5) | SO$_2$C$_6$H$_4$CH$_3$ | M.P. 226°–229°C. | NH 3.00; C=O ester 5.81; S=O 7.45/8.60/10.92 |
| (12) | COC$_8$H$_{17}$—n | semi-solid product | NH 2.99; C=O ester 5.80; C=O amide 6.04 |
| (19) | SO$_2$C$_6$H$_4$C$_{12}$H$_{25}$ | M.P. 132°–140°C. | NH 3.02; C=O ester 5.80; S=O 7.51/8.65/10.95 |
| (17) | SO$_2$C$_6$H$_4$CH$_3$ | M.P. 139°–140°C. | NH 3.07; C=O ester 5.75; S=O 7.51/8.70/10.98 |

EXAMPLE III 8.1 g of isatoic anhydride, 11.0 g of p-nonylphenol and 1.1 g of NaOH were heated under reflux in 50 ml of dioxane for 6 hours. After cooling, the reaction mixture was poured into water. 16.3 g of p-nonyl phenyl anthranilate were obtained, having the formula:

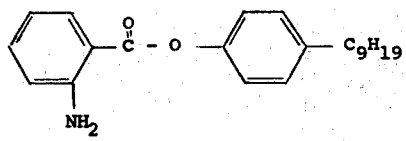

Yield 96%
Charact. IR abs. (NH$_2$ band 2.85/2.94
(C=O ester band 5.89

Starting from other substituted phenols, in an analogous way, the following compounds were obtained, having the general formula:

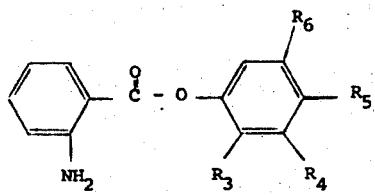     IX

TABLE 3

Part 1

| substituted phenol | solvent | anthranilate |
|---|---|---|
| p-tert.butyl- | dioxane | p-tert.butylphenyl- |
| resorcinol | dioxane | m-hydroxyphenyl- |
| p-chloro- | dioxane | p-chlorophenyl- |
| p-phenyl- | dioxane | p-phenylphenyl- |
| 2-chloro-4-phenyl- | dioxane | (2-chloro-4-phenyl)-phenyl- |
| 2,4,5-trichloro- | dioxane | 2,4,5-trichlorophenyl- |
| m-(n-)octoxy- | dioxane | m-(n-)octoxyphenyl- |
| p-tert.octyl- | acetone | p-tert.octylphenyl- |
| p-dodecyl- | dioxane | p-dodecylphenyl- |

TABLE 3

Part 2

| $R_3$ | physical constants | characteristic IR absorption bands |
|---|---|---|
| p—C(CH$_3$)$_3$ | M.P. 138°–140°C. | NH$_2$ 2.85/2.93; C=O ester 5.88 |
| m—OH | M.P. 171°–174°C. | NH$_2$ 2.85/2.95; C=O ester 5.98; OH 2.95 |
| p—Cl | M.P. 79°–80.5°C. | NH$_2$ 2.90/3.00; C=O ester 5.88 |
| p—C$_6$H$_5$ | M.P. 142°–145°C. | NH$_2$ 2.85/2.95; C=O ester 5.94 |
| 2—Cl—4—C$_6$H$_5$ | M.P. 107°–109°C. | NH$_2$ 2.88/2.98; C=O ester 5.96 |
| 2,4,5—Cl$_3$ | M.P. 129°–131°C. | NH$_2$ 2.83/2.93; C=O ester 5.85 |
| m—OC$_8$H$_{17}$—n | liquid n$_D^{20}$ = 1.5370 | NH$_2$ 2.85/2.95; C=O ester 5.90 |
| p—C(CH$_3$)$_2$CH$_2$C(CH$_3$)$_3$ | M.P. 122°–124°C. | NH$_2$ 2.88/2.97; C=O ester 5.90 |
| p—C$_{12}$H$_{25}$ | waxy product | NH$_2$ 2.85/2.94; C=O ester 5.89 |

EXAMPLE IV 14.5 g of p-nonyl phenyl anthranilate and 4.7 g of acetyl chloride were heated under reflux in 100 ml of chloroform for 3 hours. After cooling and washing with water, the solvent was distilled off. 13.4 g of compound (7) were obtained, having the formula:

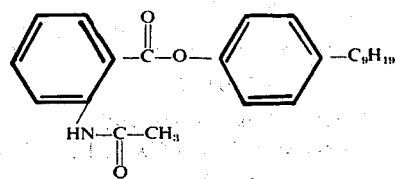

Yield 82%
M.P. 95°–98°C.
Charact. IR abs. (NH band 3.02
(C=O ester band 5.90
(C=O amide band 5.96

Starting from the substituted phenyl anthranilates, described in Example III, the following compounds were obtained having the general formula:

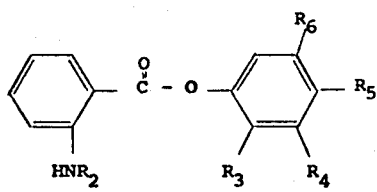

TABLE 4

Part 1

| acylating agent or sulfonating agent | solvent | base | product |
|---|---|---|---|
| acetyl chloride | chloroform | — | (6) |
| " | " | — | (10) |
| " | " | — | (8) |
| " | " | — | (9) |
| n-nonanoyl chloride | " | pyridine | (14) |
| acetyl chloride | " | — | (26) |
| " | " | pyridine | (27) |
| ketene | benzene | — | (18) |
| p-toluenesulfonyl chloride | diethyl ether | pyridine | (28) |
| acetyl chloride | chloroform | pyridine | (41) |
| " | " | — | (42) |

TABLE 4

Part 2

| product | $R_2$ | $R_3$ | physical constants | characteristics IR absorption bands |
|---|---|---|---|---|
| (6) | $COCH_3$ | p—$C(CH_3)_3$ | M.P. 163°–165°C. | NH 3.03; C=O ester 5.90; C=O amide 5.98 |
| (10) | $COCH_3$ | m—OH | M.P. 174°–177°C. | NH 3.05; C=O ester 5.90; C=O amide 6.00; OH 3.05 |
| (8) | $COCH_3$ | p—Cl | M.P. 107°–111°C. | NH 3.00 C=O ester 5.89; C=O amide 5.92 |
| (9) | $COCH_3$ | p—$C_6H_5$ | M.P. 173.5°–175.5°C. | NH 3.02; C=O ester 5.90; C=O amide 5.99 |
| (14) | $COC_8H_{17}$—n | m—OH | liquid | NH 3.00; C=O ester 5.88; C—O amide 5.90; OH 3.00 |
| (26) | $COCH_3$ | 2—Cl—4—$C_6H_5$ | M.P. 142°–144.5°C. | NH 2.99; C=O ester 5.85; C=O amide 5.92 |
| (27) | $COCH_3$ | 2,4,5—$Cl_3$ | M.P. 140°–143.5°C. | NH 2.99; C=O ester 5.88; C=O amide 5.91 |
| (18) | $COCH_3$ | m—$OC_8H_{17}$—n | M.P. 42°–46°C. | NH 3.00; C=O ester 5.89; C=O amide 5.95 |
| (28) | p—$SO_2C_6H_4CH_3$ | p—$C_9H_{19}$ | M.P. 107°–110°C. | NH 3.09; C=O ester 5.93; S=O 7.50/8.60/10.85 |
| (41) | $COCH_3$ | p—$C(CH_3)_3CH_2C(CH_3)_3$ | M.P. 168°–170°C. | NH 3.03; C=O ester 5.90; C=O amide 5.98 |
| (42) | $COCH_3$ | p—$C_{12}H_{25}$ | M.P. 65°–67°C. | NH 3.00; C=O ester 5.86; C=O amide 5.93 |

| Yield | 91% |
|---|---|
| M.P. | 66°–67°C. |
| Charact. IR abs. | (NH band 2.90 |
| | (C=O ester band 5.91 |

Starting from N-hexyl isatoic anhydride, in an analogous way, phenyl-N-hexyl anthranilate, having the formula XI ($R_1 = C_6H_{13}$) was obtained.

| Liquid product | $n_D^{20} =$ | 1.5660 |
|---|---|---|
| Charact. IR abs. | (NH band | 2.95 |
| | (C=O ester band | 5.94 |

2.27 g of the phenyl-N-methyl-anthranilate obtained, 0.86 g of acetyl chloride, 0.83 g of pyridine and 35 ml of dry chloroform were heated under reflux for 3 hours. After the solvent had been evaporated, washed and recrystallized from hexane, 2.47 g of compound (25) having the formula below ($R_1 = CH_3$) were obtained:

EXAMPLE V 23.0 g of N-methyl isatoic anhydride, 12.2 g of phenol and 1.1 g of powdered NaOH were heated in 45 ml of dioxane for 4 hours at 45°C. After cooling, the reaction mixture was poured into water. The precipitate was drawn off by suction, washed and recrystallized from an ethanol-water mixture in a ratio of 4:1. 26.8 g of phenyl-N-methyl anthranilate, having the formula below ($R_1 = CH_3$) were obtained:

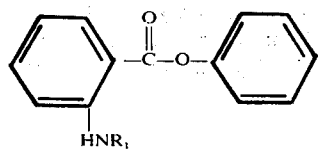

XI

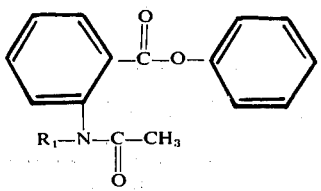

XII

| Yield | 92% |
|---|---|
| M.P. | 176°–178°C. |
| Charact. IR abs. | (C=O ester band 5.78 |
| | (C=O amide band 6.05 |

Starting from phenyl-N-hexyl anthranilate, in an analogous way, compound (44) of formula XII ($R_1 = C_6H_{13}$) was obtained.

| | | | |
|---|---|---|---|
| Liquid product | $n_D^{20} =$ | | 1.5372 |
| Charact. IR abs. | (C=O ester band | | 5.78 |
| | (C=O amide band | | 6.05 |

EXAMPLE VI

Ketene was passed into a solution of 21.3 g of phenyl anthranilate, prepared in the way described in Example I, and 100 mg of p-toluene sulphonic acid in boiling toluene for 45 minutes. After the solvent had been evaporated and recrystallized from a mixture of acetone and hexane in a ratio of 1:1, 13.3 g of compound (39) of formula XII ($R_1 = CH_3CO-$) were obtained.

| | | |
|---|---|---|
| Yield | | 45% |
| M. P. | | 85°–87°C. |
| Charact. IR abs. | (C=O ester band | 5.83 |
| | (C=O amide band | 5.91 |

EXAMPLE VII 8.5 g of phenyl anthranilate, prepared in the way described in Example I, 4.1 g of terephthaloyl chloride, and 4.8 ml of pyridine were heated under reflux in chloroform for 4 hours. After cooling, the precipitate was drawn off by suction, washed with hydrochloric acid and water and recrystallized from chloroform. 10.1 g of compound (34) having the formula:

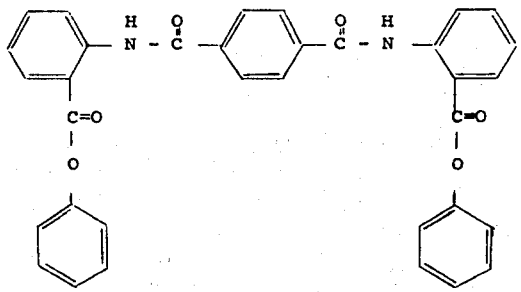

were obtained.

| | | |
|---|---|---|
| Yield | | 91% |
| M. P. | | 221°–224°C. with decomposition |
| Charact. IR abs. | (NH band | 3.01 |
| | (C=O ester band | 5.92 |
| | (C=O amide band | 5.99 |

Starting from phenyl anthranilate, in an analogous way, the following compounds were obtained, having the general formula:

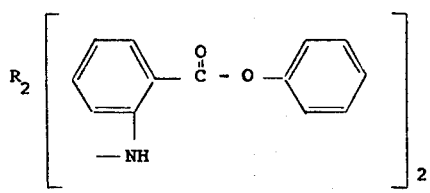

TABLE 5

Part 1

| acylating agent or sulfonating agent | solvent | base | product |
|---|---|---|---|
| phosgene | diethyl ether | pyridine | (29) |
| oxalyl chloride | chloroform | " | (30) |
| adipoyl chloride | " | " | (31) |
| dodecanoic dichloride | " | " | (35) |

TABLE 5

Part 2

| product | $R_2$ | physical constants | characteristic IR absorption bands |
|---|---|---|---|
| (29) | >CO | M.P. 173°–177°C. | NH 3.00; C = O ester 5.90; C = O amide 5.90 |
| (30) | CO.CO | M.P. 281°–283.5°C. (decomp.) | NH 3.05; C = O ester 5.84; C = O amide 5.90 |
| (31) | —CO(CH$_2$)$_4$CO | M.P. 126°–130°C. | NH 3.00; C = O ester 5.88; C = O amide 5.92 |
| (35) | —CO(CH$_2$)$_{10}$CO | M.P. 52°–56°C. | NH 3.00; C = O ester 5.90; C = O amide 5.90 |

EXAMPLE VIII 6.81 g of phenyl-N-methyl anthranilate, prepared in the way described in Example V, 2.75 g of adipoyl chloride and 5 ml of pyridine were heated under reflux in 50 ml of chloroform for 4 hours. After cooling, the solution was washed with hydrochloric acid and then with water to neutrality. After the solvent had been evaporated, petroleum ether was added and then the precipitate formed was drawn off by suction and dried. 5.50 g of compound (38) having the formula:

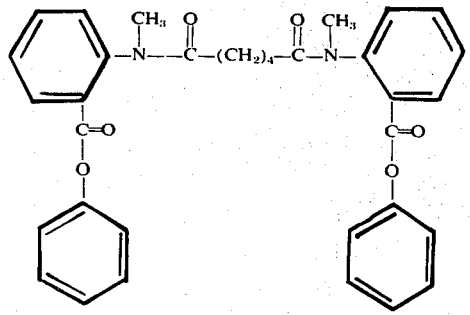

were obtained:

| | | |
|---|---|---|
| Yield | | 65% |
| M. P. | | 140°–145°C. |
| Charact. IR abs. | (C=O ester band | 5.81 |
| | (C=O amide band | 6.08 |

EXAMPLE IX 5.0 g of phenyl-m-aminobenzoate, obtained in the way described in Example II, 2.15 g of adipoyl chloride and 5 ml of pyridine were heated under reflux in 50 ml of chloroform for 4.5 hours. After cooling, the solution was washed with dilute hydrochloric acid and subsequently with water and a sodium bicarbonate solution to neutrality. After the solvent had been dried and distilled off, the residue was incorporated in benzene, decolorized with carbon and again precipitated with petroleum ether. After filtration, 4.25 g of compound (33) having the general formula below were obtained:

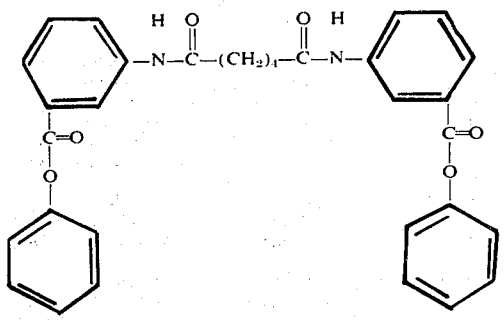

| | |
|---|---|
| Yield | 68% |
| M.P. | 153°–156°C. |
| Charact. IR abs. | (NH band 2.95 |
| | (C=O ester band 5.85 |
| | (C=O amide band 5.92 |

Starting from phenyl-p-aminobenzoate and sulfonyl chloride, in an analogous way, compound (32) having the formula:

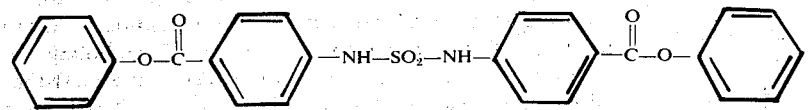

were obtained.

| | |
|---|---|
| M. P. | 221°–224°C. |
| Charact. IR abs. | (NH band 2.90 |
| | (C=O ester band 5.81 |

EXAMPLE X 3.39 g of p-nonylphenyl anthranilate, obtained in the way described in Example III, 0.92 g of adipoyl chloride and 5 ml of pyridine were heated under reflux in 30 ml of chloroform for 8 hours. After cooling and washing with water, the solvent was distilled off and recrystallized from hexane. 2.84 g of compound (37) having the formula given below ($R_5 = C_9H_{19}$) were obtained.

[Structure XIV shown]

| | |
|---|---|
| Yield | 72% |
| M.P. | 135°–138°C. |
| Charact. IR abs. | (NH band 2.99 |
| | (C=O ester band 5.85 |
| | (C—O amide band 5.97 |

Starting from p-tert.butyl-phenyl-anthranilate, in an analogous way, compound (36) of formula XIV ($R_5 = (CH_3)_3C—$) was obtained.

| | |
|---|---|
| M. P. | 225°–230°C. |
| Charact. IR abs. | (NH band 3.01 |
| | (C=O ester band 5.89 |
| | (C=O amide band 5.92 |

EXAMPLE XI 100 g of polyvinyl chloride, 35 g of dioctyl phthalate, 2 g of a commercially available barium-cadmium stabilizer which is a barium-cadmium-laurate-myristate mixture (Estabex BC-148) and 200 mg of compound (6) were mixed on a roll mixer at 180°C. until a homogeneous, colorless, transparent sheet was obtained. This sheet was pressed to a uniform thickness of 0.2 mm. Subsequently, it was subjected to ultraviolet radiation in a Xenotester for 2,000 hours. Next, the degradation was determined visually and rated according to numerical scale ranging from 0 to 6, wherein the value 0 indicates that no degradation had taken place.

In an analogous way, the stabilizing power of other compounds according to the present invention was determined. The compounds used and the degradation measured are listed in Table 6.

TABLE 6

| Compound | None (control) | (1) | (45) | (4) | (5) | (46) | (6) | (30) | (47) |
|---|---|---|---|---|---|---|---|---|---|
| Degradation | 6 | 1 ½ | 1 ½ | 2 | 1 ½ | 3 | 1 | 1 ½ | 3 |

| (10) | (9) | (7) | (15) | (17) | (27) | (31) | (33) | (32) | (34) | (38) |
|---|---|---|---|---|---|---|---|---|---|---|
| 3 ½ | 3 | 3 | 2 ½ | 2 ½ | 2 | 1 ½ | 1 ½ | 1 | 1 | 2 |

| (3) | (2) | (48) | (49) | (35) | (24) | (21) |
|---|---|---|---|---|---|---|
| 1 | 1 | 3 | 1 | 1 ½ | 1 ½ | 2 |

EXAMPLE XII 100 g of high-density polyethylene were mixed with 250 mg of compound (7) and worked up on a roll mixer into a colorless, transparent sheet at a temperature of 120°C. This sheet was pressed to a uniform thickness of 0.2 mm and subsequently subjected to ultraviolet radiation in a Xenotester for 2,000 hours. As a measure of the degradation of the sheet, the carbonyl content was determined. This content was 0.11. A sheet stabilized with compound (42) and a non-stabilized sheet had a carbonyl content of 0.12 and 0.40 respectively.

EXAMPLE XIII 100 g of polystyrene and 0.2 g of compound (1) were mixed on a roll mixer at 130°C. until a homogeneous, colorless, transparent sheet was obtained. This sheet was pressed to a uniform thickness of 0.2 mm. Subsequently it was subjected to ultraviolet radiation in a Xenotester for 2,000 hours. Next, the degradation was determined in the way described in Example XI. This was 3. A sheet stabilized with compound (5) and a non-stabilized sheet had a degradation of 4 and 6 respectively.

EXAMPLE XIV 100 g of unsaturated polyester resin, 2 g of a commercially available organic peroxide which is a mixture of benzoyl peroxide (50% by weight) and dimethylphthalate (Lucidol) and 0.2 g of compound (2) were mixed and poured into a sheet with a uniform thickness of 1 mm. This sheet was hardened for 2 hours at about 80°–90°C. and subsequently subjected to ultraviolet radiation in a Xenotester for 2000 hours. Next, the degradation was determined in the way described in Example XI. This was 4. A sheet stabilized with compound (1) and a non-stabilized sheet had a degradation of 4 and 6 respectively.

What is claimed is:

1. The compound N,N'-bis(p-phenoxycarbophenyl sulfondiamide.

* * * * *